(12) United States Patent
Park et al.

(10) Patent No.: US 6,912,310 B1
(45) Date of Patent: Jun. 28, 2005

(54) VIDEO OBJECT SEGMENTATION USING ACTIVE CONTOUR MODEL WITH DIRECTIONAL INFORMATION

(75) Inventors: HyunWook Park, Taejon (KR); Todd Schoepflin, Seattle, WA (US); Shijun Sun, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 550 days.

(21) Appl. No.: 09/649,694

(22) Filed: Aug. 28, 2000

Related U.S. Application Data

(63) Continuation-in-part of application No. 09/323,501, filed on Jun. 10, 1999, now Pat. No. 6,546,117.

(51) Int. Cl.[7] .............................. G06K 9/48; G06K 9/46; G06K 9/64
(52) U.S. Cl. ...................... 382/199; 382/203; 382/279
(58) Field of Search .............................. 382/107, 195, 382/197, 205, 199, 203, 279; 345/420

(56) References Cited

U.S. PATENT DOCUMENTS

| | | | | |
|---|---|---|---|---|
| 5,142,592 | A | * 8/1992 | Moler | 382/200 |
| 5,239,591 | A | * 8/1993 | Ranganath | 382/128 |
| 5,335,298 | A | * 8/1994 | Hevenor et al. | 382/199 |
| 5,446,804 | A | * 8/1995 | Allebach et al. | 382/298 |
| 5,999,651 | A | * 12/1999 | Chang et al. | 382/215 |
| 6,078,680 | A | * 6/2000 | Yoshida et al. | 382/128 |
| 6,195,445 | B1 | * 2/2001 | Dubuisson-Jolly et al. | 382/107 |
| 6,201,543 | B1 | * 3/2001 | O'Donnell et al. | 345/420 |
| 6,346,124 | B1 | * 2/2002 | Geiser et al. | 600/450 |
| 6,480,615 | B1 | * 11/2002 | Sun et al. | 382/103 |
| 6,546,117 | B1 | * 4/2003 | Sun et al. | 382/103 |

OTHER PUBLICATIONS

Xu et al., "Snakes, shapes, and gradient vector flow", IEEE transactions on Image Processing, Mar. 1998.*
Russ, The Image Processing Handbook, CRC Press, 1994, pp. 237–249.*
Meir et al., "Automatic Segmentation of Moving Objects for Video Object Plane Generation," IEEE Transaction on Circuits and Systems for Video Technology, vol. 8, No. 5, Sep. 1998 pp 525–538.
Gu et al., Semiautomatic Segmentation and Tracking of Semantic Video Generation, IEEE Transaction on Circuits and Systems for Video Technology, vol. 8, No. 5, Sep. 1998 pp 572–584.
Kass et al., "Snakes: Active Contour Models," IEEE Doc. No. CH2465–3/87/0000/0259; 1987.
Amini et al., "Using Dynamic Programming for Solving Variational Problems in Vision," IEEE Transaction on Pattern Analysis and Machine Intelligence, vol. 12, No. 9, Setp. 1990, pp 855–867.

* cited by examiner

*Primary Examiner*—Mehrdad Dastouri
(74) *Attorney, Agent, or Firm*—Steven P. Koda

(57) ABSTRACT

Object segmentation and tracking are improved by including directional information to guide the placement of an active contour (i.e., the elastic curve or 'snake') in estimating the object boundary. In estimating an object boundary the active contour deforms from an initial shape to adjust to image features using an energy minimizing function. The function is guided by external constraint forces and image forces to achieve a minimal total energy of the active contour. Both gradient strength and gradient direction of the image are analyzed in minimizing contour energy for an active contour model.

15 Claims, 8 Drawing Sheets

US 6,912,310 B1

VIDEO OBJECT SEGMENTATION USING ACTIVE CONTOUR MODEL WITH DIRECTIONAL INFORMATION

CROSS REFERENCE TO RELATED APPLICATIONS

This is a continuation-in-part of U.S. Pat. No. 6,546,117 issued Apr. 8, 2003 based on application Ser. No. 09/323,501 filed Jun. 10, 1999 for "Video Object Segmentation Using Active Contour Modelling with Global Relaxation. " The content of such document is incorporated herein by reference and made a part hereof.

This invention is related to U.S. Pat. No. 6,301,387 issued Oct. 9, 2001 based on application Ser. No. 09/216,692, filed Dec. 18, 1998 for "Template Matching Using Correlative Auto-Predictive Search;" U.S. Pat. No. 6,243,494 issued Jun. 5, 2001 based on application Ser. No. 09/216,691, filed Dec. 18, 1998 for "Template Matching in Three Dimensions Using Correlative Auto-Predictive Search"; and U.S. Pat. No. 6,272,250 issued Aug. 7, 2001 based on application Ser. No. 09/233,894, filed Jan. 20, 1999 for "Color Clustering for Scene Change Detection and Object Tracking in Video Sequences." The content of all such documents are incorporated herein by reference and made a part hereof.

BACKGROUND OF THE INVENTION

This invention relates to object tracking and segmentation within a sequence of image frames, and more particularly to object tracking and segmentation using an active contour model to estimate an optimal contour edge of the object being tracked.

When tracking an object among multiple frames of a video sequence, the object boundary is identified in each frame. The object is the area within the boundary. The challenge in identifying the object boundary in a given frame increases as the constraints on a trackable object are relaxed to allow tracking an object which translates, rotates or deforms. Once the object is identified in one frame, template matching may be used in a subsequent frame to detect translation of the object. The template typically is the object as identified in the prior frame.

Active contour models, also known as snakes, have been used for adjusting image features, in particular image object boundaries. In concept, active contour models involve overlaying an elastic curve onto an image. The curve (i.e., snake) deforms itself from an initial shape to adjust to the image features. An energy minimizing function is used which adapts the curve to image features such as lines and edges. The function is guided by external constraint forces and image forces. The best fit is achieved by minimizing a total energy computation of the curve. In effect, continuity and smoothness constraints are imposed to control deformation of the model. The model is the object from a prior frame. A shortcoming of the active contour model is that small changes in object position or shape from one frame to the next may cause the boundary identification to fail. In particular, rather than following the object, the estimated boundary instead latches onto strong false edges in the background, distorting the object contour.

Yuille et al. in "Feature Extraction from Faces Using Deformable Templates," International Journal of Computer Vision, Vol. 8, 1992, disclose a process in which eyes and mouths in an image are identified using a model with a few parameters. For example, an eye is modeled using two parabolas and a circle radius. By changing the shape of the parabolas and the circle radius, eyes can be identified. Yuille et al. and other deformation models typically have encompassed only highly constrained deformations. In particular, the object has a generally known shape which may deform in some generally known manner. Processes such as an active contour model have relaxed constraints, but are only effective over a very narrow spatial range of motion. Processes like that disclosed by Yuille are effective for a wider spatial range of motion, but track a very constrained type of motion. Accordingly, there is a need for a more flexible and effective object tracker, which can track more active motions over a wider spatial range.

SUMMARY OF THE INVENTION

According to the invention, object segmentation and tracking are improved by including directional information to guide the placement of the active contour (i.e., the elastic curve or 'snake') in estimating the object boundary.

The problem addressed by the invention is that the active contour may converge on the wrong set of image points for objects which move rapidly from one frame to the next. In estimating an object boundary the active contour deforms from an initial shape to adjust to image features using an energy minimizing function. The function is guided by external constraint forces and image forces to achieve a minimal total energy of the active contour. Conventionally, continuity and smoothness constraints are imposed to control deformation of the active contour. According to an aspect of this invention, directional information is included to provide additional guidance and control. Specifically, in minimizing the active contour energy function both gradient strength and gradient direction of the image are analyzed.

An advantage of including directional information is that the directional 'snake' (i.e., the active contour model based on gradient strength and gradient direction) provides more accurate segmentation when there are multiple edge point candidates in a given neighborhood having differing directions. Accordingly, directional information is now incorporated into digital video segmentation.

These and other aspects and advantages of the invention will be better understood by reference to the following detailed description taken in conjunction with the accompanying drawings.

DESCRIPTION OF SPECIFIC EMBODIMENTS

Overview

Figure 1:
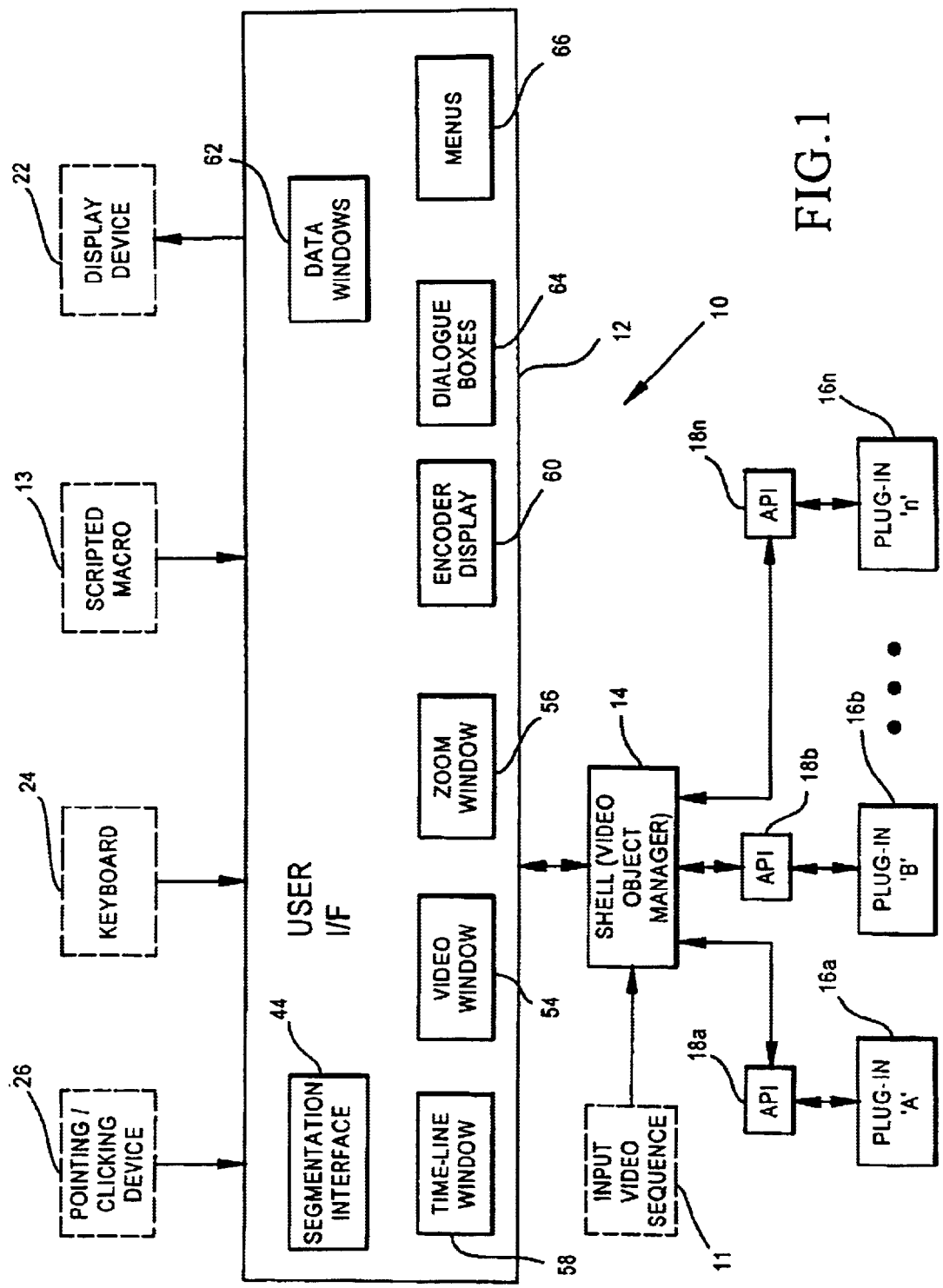
FIG. 1 is a block diagram of an interactive processing environment for tracking video objects among a sequence of video frames.

FIG. 1 shows a block diagram of an exemplary host interactive processing environment 10 for locating, tracking and encoding video objects. The processing environment 10 includes a user interface 12, a shell environment 14 and a plurality of functional software 'plug-in' programs 16.The user interface receives and distributes operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
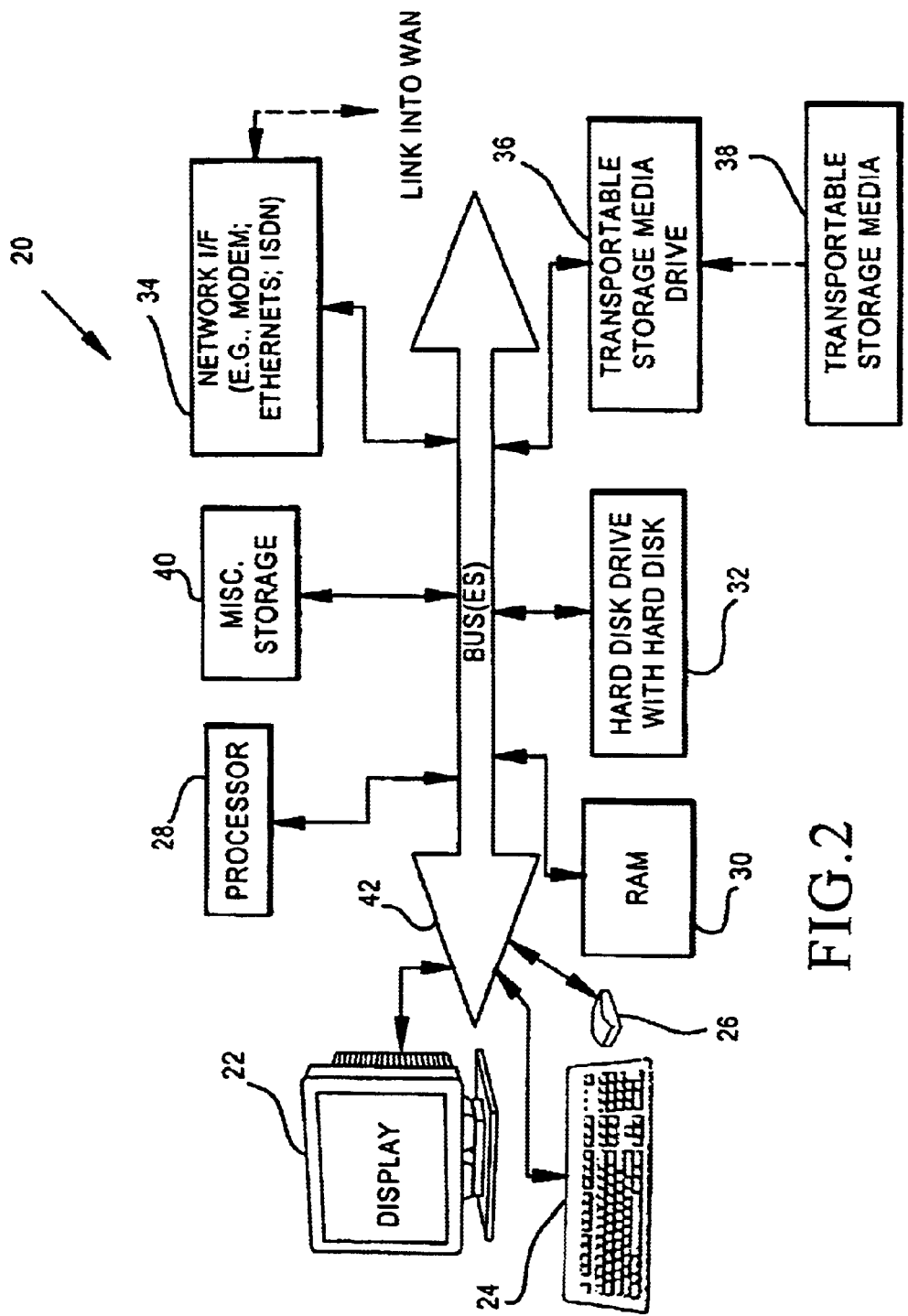
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation, personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

Software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, a ROM, a hard disk, an optical disk, a floppy disk, a magneto-optical disk, an electro-optical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment and User Interface

The shell environment 14 allows an operator to work in an interactive environment to develop, test or use various video processing and enhancement tools. In particular, plug-ins for video object segmentation, video object tracking and video encoding (e.g., compression) are supported in a preferred embodiment. The interactive environment 10 with the shell 14 provides a useful environment for creating video content, such as MPEG-4 video content or content for another video format. A pull-down menu or a pop up window is implemented allowing an operator to select a plug-in to process one or more video frames.

In a specific embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program. The tracking program identifies the video object in subsequent video frames. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation and tracking plug-ins do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a specific embodiment each plug-in 16 is executed in a separate processing thread. As a result, the user interface 12 may display a dialog box that plug-ins can use to display progress, and from which a user can make a selection to stop or pause the plug-in's execution.

Referring again to FIG. 1, the user interface 12 includes the segmentation interface 44 and various display windows 54–62, dialogue boxes 64, menus 66 and button bars 68, along with supporting software code for formatting and maintaining such displays. In a preferred embodiment the user interface is defined by a main window within which a user selects one or more subordinate windows, each of which may be concurrently active at a given time. The subordinate windows may be opened or closed, moved and resized.

In a preferred embodiment there are several subordinate windows 52, including a video window 54, a zoom window 56, a time-line window 58, one or more encoder display windows 60, and one or more data windows 62. The video window 54 displays a video frame or a sequence of frames. For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The time-line window 58 includes an incremental time-line of video frames, along with zero or more thumb nail views of select video frames. The time line window 58 also includes a respective time-line for each video object defined for the input video sequence 11. A video object is defined by outlining the object.

The data window 62 includes user-input fields for an object title, translucent mask color, encoding target bit rate, search range and other parameters for use in defining and encoding the corresponding video object.

During encoding one of the encoder windows 60 is displayed. For example, an encoder progress window shows the encoding status for each defined video object in the input video sequence 11.

Video Object Tracking and Segmentation

Figure 3:
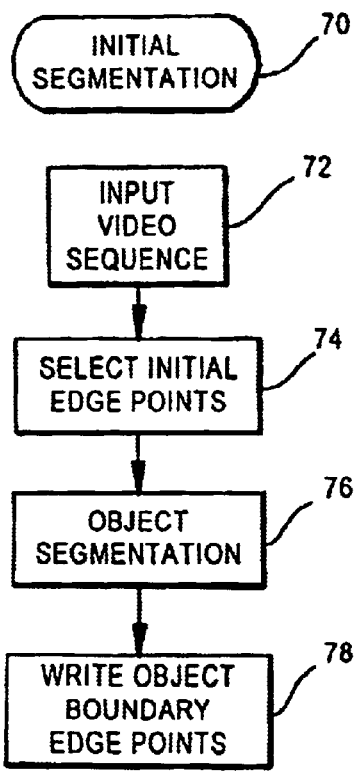
FIG. 3 is a flow chart for a segmentation process for initially selecting and segmenting an object to be tracked.

To track an object, the first step is to define a template to use which corresponds to the object. FIG. 3 is a flow chart 70 for initially segmenting a video object according to an embodiment of this invention to achieve an initial template. In one embodiment an operator loads in an input video sequence at step 72, and selects points or line segments approximating a boundary of the object at step 74. A segmentation then is applied at step 76 to more accurately define the boundary. The segmentation is performed using an active contour model, as described below in a separate section.

The edge points which define the object boundary are output at step 78. Such edge points are used as control points for another plug-in, such as to define and overlay an object mask (i.e., template) onto the image frame to visually distinguish the object being tracked. Also, the operator may adjust points on the boundary to refine the boundary, and re-execute the segmentation algorithm using the refined boundary points to achieve a desired and accurate object. Such object serves as an initial template for locating the object in another frame.

In a preferred embodiment, the located object in a given frame serves as the initial template when searching for the object in the next frame to be processed. Such next frame may be the succeeding image frame in the video sequence, or the next frame to be sampled in the video sequence, or any other frame, either in sequence or out of sequence, which is the next frame to be processed. According to such approach the initial template is always changing for each frame to be processed.

Figure 4:
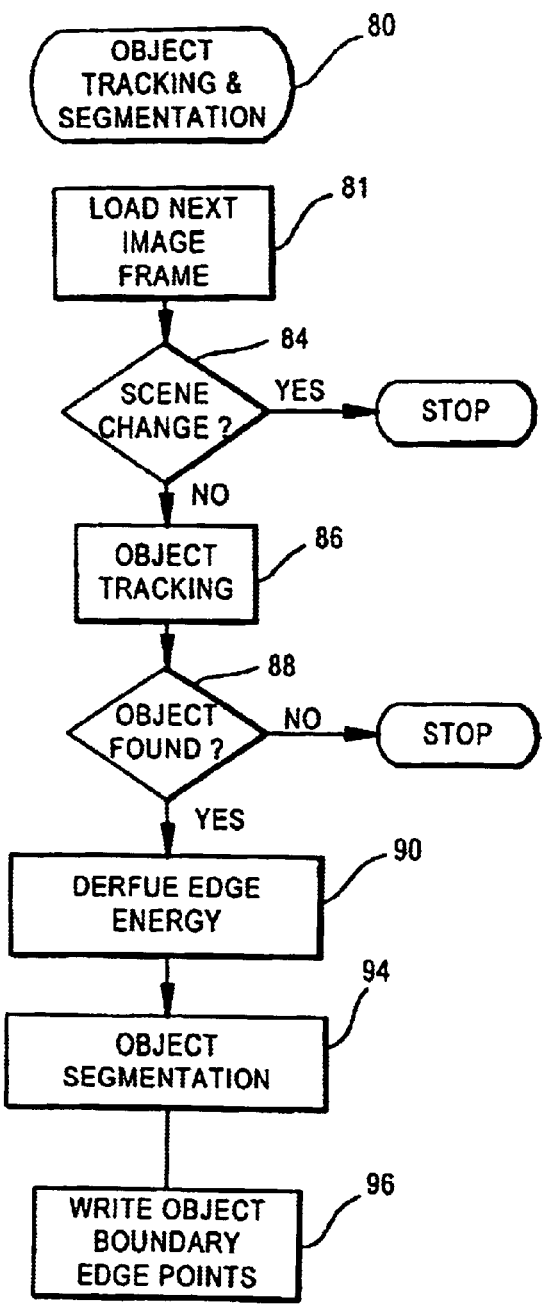
FIG. 4 is a flow chart of an object tracking and segmentation method according to an embodiment of this invention.

FIG. 4 is a flow chart 80 for tracking an object in subsequent frames following identification and segmentation of the object in an initial frame. At step 81 the next image frame to be processed is input. At step 84 testing is performed to identify whether there has been a scene change. Although various approaches may be implemented, in one embodiment a modified applied resonance theory M-ART2 method is performed as described in commonly-assigned U.S. patent application Ser. No. 09/323,501 filed Jun. 10, 1999 naming Sun et al. titled, "Video Object Segmentation Using Active Contour Model with Global Relaxation," incorporated herein by reference and made a part hereof.

If a scene change is detected at step 84, then the process 80 is complete, or is re-initialized to track another image object. If a scene change has not occurred, then the image object is coarsely identified from the image frame at step 86, using any of various object tracking techniques. In one embodiment a two-dimensional correlative auto-predictive search (2D-CAPS) process is performed. In another embodiment a three-dimensional correlative auto-predictive search (3D-CAPS) process is performed. If at step 88 the image object is not found using the 2D-CAPS process, then the process 80 terminates or re-initializes for tracking another object.

If the object is identified, then the edge energy for the object boundary is derived at step 90. At step 94 an object segmentation process is performed based on an active contour model as described below in a separate section. The active contour model is applied to segment the image boundary and accurately model the object boundary. At step 96 the estimated image boundary is output. As described above for the initial image frame, in some embodiments the output is written to a buffer, a file, and/or to a video screen. The process 80 then repeats for another image frame. As a result, an image object is segmented and tracked over many image frames.

Edge Energy

Edge energy is a measure of the potential energy of a set of image pixels which identifies an edge based upon the relative energy values of pixels. Various measures of potential energy may be implemented. In one embodiment a multiple level wavelet decomposition algorithm is used to extract high frequency components of an image.

The high frequency details are analyzed to identify image object edges. For example, a Haar wavelet may be used.

The input to be processed to derive edge potential energy is an image. In one embodiment the image is the entire image frame. In other embodiments, the image is an image object. The derived edge potential energy is an array of potential energy for each data point (pixel) of the image.

Figure 5:
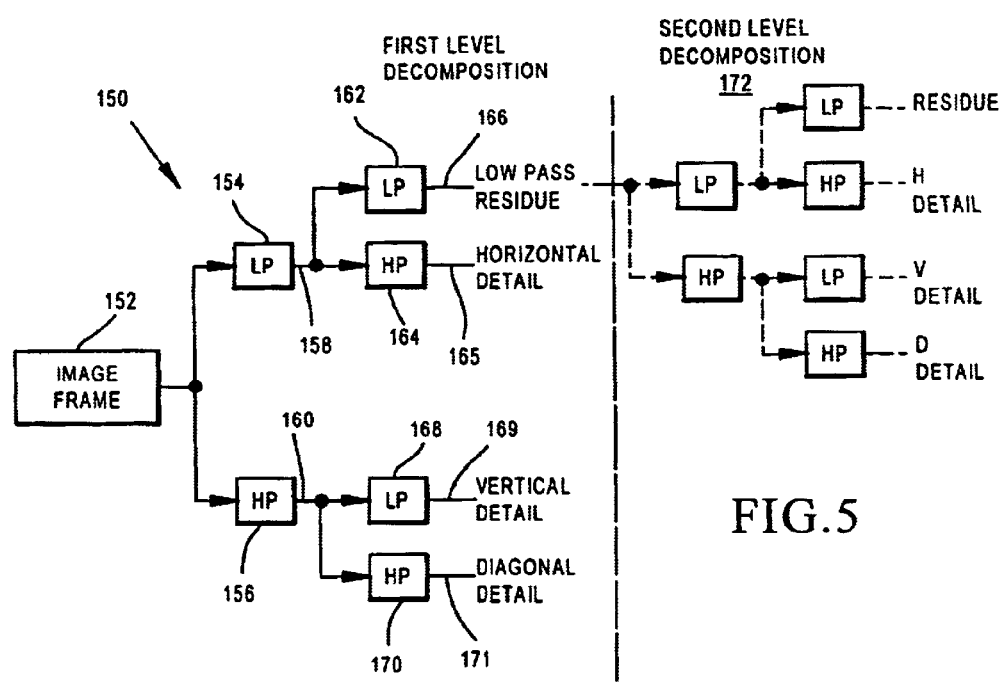
FIG. 5 is a diagram of a quadrature modelling filter for decomposing an image to achieve detailing images and a low pass residue.

In one embodiment the input image is decomposed by filtering the image with a quadrature mirror filter (QMF) pair which brings out the image details, while simultaneously smoothing the image. The QMF pair includes a high pass filter for bringing out the image details, and a low pass filter for smoothing the image. Referring to FIG. 5 a multiple level QMF decomposition 150 of an image frame 152 is shown. The image frame 152 is passed through a low pass filter 154 and a high pass filter 156 to obtain a low pass component 158 and a high pass component 160. These components, in turn, are filtered. The low pass component 158 is passed through a low pass filter 162 and a high pass filter 164. The output of low pass filter 162 is low pass residue 166. The output of high pass filter 164 is the horizontal detail 165 of the image frame 152.

In parallel, the high pass component 160 is passed through a low pass filter 168 and a high pass filter 170. The output of the low pass filter 168 is the vertical detail 169 of the image frame 152. The output of the high pass filter 170 is the diagonal detail 171 of the image frame 152. The low pass residue 166 and the three detailing images 165, 169, 171 are the first level QMF decomposition of the image frame 152. In some embodiments a second level QMF decomposition 172 also is performed in which the low pass residue 166 is input similarly through two stages of low pass and high pass filters to achieve a second-level, low-pass residue and three detailing images (horizontal detail, vertical detail and diagonal detail). In some embodiments the same filters may be used in the second level decomposition as were used in the first level decomposition. for example, the low pass residue 166 is merely input to filters 154, 156 instead of the image frame 152.

The high pass filtering function is a wavelet transformation ($\psi$), while the low pass filtering function is a scaling function ($\phi$) corresponding with the wavelet. The scaling function causes smoothing, while the three wavelets bring out the image details. The scaling function and wavelet transforms in one dimensional space are given by the equations below:

$$\phi_{a,b}(x) = \frac{1}{\sqrt{a}} \phi\left(\frac{x-b}{a}\right), a > b, b \in R$$

$$\psi_{a,b}(x) = \frac{1}{\sqrt{a}} \psi\left(\frac{x-b}{a}\right), a > 0, b \in R$$

where, $\phi_{a,b}(x)$ is the family of scaling function at scale a and translated by b;

$\psi_{a,b}(X)$ is the family of wavelets at scale a and translated by b;

a is the scaling factor;

b is the translation desired $\phi$ is $\phi_{0,0}$; and $\psi$ is $\psi_{0,0}$.

Two dimensional wavelets are defined as tensor products of the one-dimensional wavelets. The two-dimensional scaling function is $\phi(x,y)=\phi(x)*\phi(y)$. The two-dimensional wavelets are:

$$\psi_1(x,y)=\phi(x)*\psi(y)$$

$$\psi_2(x,y)=\phi(y)*\psi(x)$$

$$\psi_3(x,y)=\phi(x)*\psi(y)$$

Although the scaling may be varied from one level of decomposition to another, in one embodiment such scaling is not varied.

A first level QMF decomposition is performed. For a second level decomposition the low pass residue 166 of the first level decomposition is analyzed without further downsampling. In some embodiments additional levels of decomposition may be obtained by passing the low pass residue of the prior level through a two stage filtering process (similar to that for the prior levels).

For any given level of decomposition there are four images: the low pass residue, the vertical detail, the horizontal detail and the diagonal detail. The horizontal and vertical detail are gradients of the image along x and y axes. The magnitude of the image is taken at every level of decomposition. The diagonal details have been omitted in one embodiment, because they did not contribute significantly.

In one embodiment up to five levels of decomposition are used for each color component of the image frame, in which the low pass residue from the prior stage is input to the filters 154, 156 to generate image details and residue for the current stage. Preferably, only data from the even levels (e.g., levels 2, 4, and 6) are used to avoid half-pixel shifts in the edge energy. The integration of the multiple levels and multiple channel (color component) data is guided by their principal component. In one implementation the ratio of multiple-level edge gradients is selected as 1:2:4:8:16 for the five levels of decomposition. With respect to the color components (Y, Cr, Cb), edge gradient ratios of 1:1: are used.

In one embodiment the horizontal detail and vertical detail of a given level (i) of decomposition are combined to generate the edge potential energy (EPE) for that level as follows:

$$EPE(i) = \text{sqrt}[Gx^2(i) + Gy^2(i)]$$

where, Gx(i)=horizontal detail (i)
Gy(i)=vertical detail (i)
i=i-th level of decomposition.

For an embodiment in which 5 levels of decomposition are executed, the total edge potential energy (EPE) for a given color component are summed together:

$$EPE_c = EPE_c(2) + 2 * EPE_c(4) + 4 * EPE_c(6) + 8 * EPE_c(8) + 16 * EPE_c(10)$$

$$Gx_c = Gx_c(2) + 2Gx_c(4) + 4Gx_c(6) + 8Gx_c(8) + 16Gx_c(10)$$

$$Gy_c = Gy_c(2) + 2Gy_c(4) + 4Gy_c(6) + 8Gy_c(8) + 16Gy_c(10)$$

where c is the color component being processed.

The overall edge potential energy for the entire frame, inclusive of all color components is the weighted sum of the energy from the different color components. For a weighting factor of (1, 1, 1) the total potential energy is given by:

Total Edge Potential Energy=$EPE_y + EPE_{cr} + EPE_{cb}$ $Gx = Gx_y + Gx_{cr} + Gx_{cb}$ $Gy = Gy_y + Gy_{cr} + Gy_{cb}$ where 'y', 'cr' and 'cb' are the color components. In other embodiments R,G and B color components or those of another color component model may be used. The weighting factor may vary depending on the color components model being used.

The total edge potential energy is an array having an energy value for each pixel of the image processed. Although a detailed description of an edge energy derivation is described, alternate methods of deriving edge energy may be used.

Object Segmentation Using Modified Active Contour Model

Once an object in an image has been identified, the boundary of the object (i.e., edge) is segmented to more accurately model the object edges. According to a preferred embodiment the object segmentation process 76/94 is based on an active contour model. For an initial segmentation (e.g., process 70) the image object boundary to be better estimated is the boundary input to the system with points selected at step 74 (see FIG. 3). For subsequent image frames the segmentation process 94 receives the derived total edge potential energy and a current image object boundary as inputs. The total edge potential energy is derived at step 90. The current image object boundary is derived by the object tracking process at step 86.

An active contour model is an energy-minimizing spline or curve guided by internal constraint forces and influenced by external image forces that pull the curve toward features like lines and edges. Two alternative active contour model embodiments are described below to perform the object segmentation of steps 76, 94. In one embodiment a gradient descent search process is modified to consider directional information (see FIGS. 6–7). In another embodiment a dynamic programming search is performed, including the consideration of directional information (see FIGS. 8–11). Following is a discussion of the modified gradient descent embodiment. The dynamic programming embodiment is described in a subsequent section.

The conventional energy function in the gradient descent embodiment is defined in discrete form as follows:

$$E_{snake} = \sum_{i=1}^{N} (E_{int}(i) + E_{ext}(i)) \quad (1)$$

where $E_{int}(i)$ and $E_{ext}(i)$ are the internal spline energy and the external image energy at the ith position of the contour (called snaxel $s_i$), respectively, which can be defined as:

$$E_{int}(i) = \alpha_i |s_i - s_{i-1}|^2 + \beta_i |s_{i-1} - 2s_i + s_{i+1}|^2 \quad (2)$$

$$E_{ext}(i) = -|\nabla f(s_i)| \quad (3)$$

where $f(s_i)$ is the original pixel value at $s_i$. In Equation (1), N is the number of snaxels, and the order of sequencing snaxels is counterclockwise along the closed contour. The weighting factors, $\alpha_i$ and $\beta_i$, are defined to control the relative importance of the membrane and thin-plate terms for the i-th snaxel, respectively, and $s_i$ is the 2D coordinates of the i-th snaxel, $x_i$ and $y_i$. The external energy is set to be the negative magnitude of the image gradient above, so that the snake is attracted to the regions with low external energy, i.e., strong edges.

The optimum locations of the snaxels are searched so that the snake energy $E_{snake}$ can be minimized. In an exemplary embodiment, a gradient descent method attempts to minimize the snake energy by finding new snaxel positions iteratively:

$$\overline{x_1} = (A - \gamma I)^{-1} (\gamma \overline{x_{t-1}} - \overline{h_x}(\overline{x_{t-1}}, \overline{y_{t-1}}))$$

$$\overline{y_1} = (A - \gamma I)^{-1} (\gamma \overline{y_{t-1}} - \overline{h_y}(\overline{x_{t-1}}, \overline{y_{t-1}})) \quad (4)$$

where A is a pentadiagonal matrix containing the numerical coefficients for descending the gradient of the internal energy $E_{int}$, g is a step size, and column vectors of.

$\overline{x_t}, \overline{y_t}, \overline{h_x}(\overline{x_{t-1}}, \overline{y_{t-1}})$ and $\overline{h_y}(\overline{x_{t-1}}, \overline{y_{t-1}})$ are given as:

$$\overline{x_1} = (x_1 x_2 x_3 \ldots x_{N-1} x_N)^T \text{ at time } t \quad (5)$$

$$\overline{y_1} = (y_1 y_2 y_3 \ldots y_{N-1} y_N)^T \text{ at time } t \quad (5)$$

$$\overline{h_x}(\overline{x_{i-1}}, \overline{y_{i-1}}) = \left( \frac{\partial E_{ext}(1)}{\partial x_1} \frac{\partial E_{ext}(2)}{\partial x_2} \frac{\partial E_{ext}(3)}{\partial x_3} \ldots \frac{\partial E_{ext}(N-1)}{\partial x_{N-1}} \frac{\partial E_{ext}(N)}{\partial x_N} \right)^T \text{ at time } t-1$$

$$\overline{h_y}(\overline{x_{i-1}}, \overline{y_{i-1}}) = \left( \frac{\partial E_{ext}(1)}{\partial y_1} \frac{\partial E_{ext}(2)}{\partial y_2} \frac{\partial E_{ext}(3)}{\partial y_3} \ldots \frac{\partial E_{ext}(N-1)}{\partial y_{N-1}} \frac{\partial E_{ext}(N)}{\partial y_N} \right)^T \text{ at time } t-1$$

where $x^T$ denotes the transpose of the vector x. In Eq. (4), I is an N×N identity matrix. Eq. (4) is iterated, producing a local minimum for the snake energy. As shown in these equations, the external energy is defined from the magnitude of the gradient image.

The gradient image is obtained by applying a gradient operator, such as Sobel, Prewitt, or derivative of Gaussian (DOG). The image is convolved with the gradient operator, which typically consists of horizontal and vertical gradient kernels. In a specific embodiment the gradient magnitude $|\nabla f(x,y)|$ and direction $\theta G(x,y)$ are obtained from a 2D image as follows:

$$|\nabla f(x, y)| = \sqrt{G_x(x, y)^2 + G_y(x, y)^2} \quad (6)$$

-continued $$\theta_G(x, y) = \arctan\left(\frac{G_y(x, y)}{G_x(x, y)}\right)$$

where $G_x(x,y)=f(x,y)*K_x(x,y)$ $G_y(x,y)=f(x,y)*K_y(x,y)$ where * denotes a convolution operation and $K_x(x,y)$ and $K_y(x,y)$ are the horizontal and vertical gradient kernels, respectively.

In the conventional contour as defined in Eqs. (1)–(3), only the gradient magnitude contributes to the contour energy. Thus, the contour may be attracted to a strong edge that has a different gradient direction from the correct boundary.

Figure 6A:
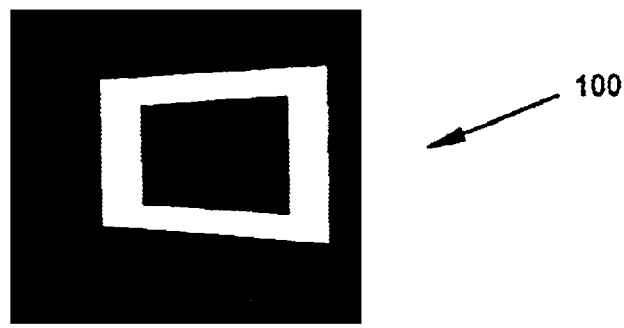
FIG. 6A is a sample black and white image.
Figure 6B:
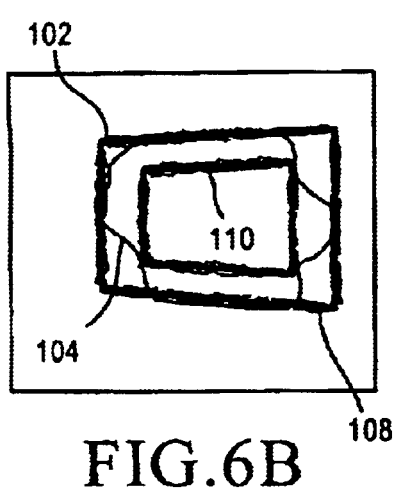
FIGS. 6B and 6C are the gradient magnitude image of the black and white image of FIG. 6A with a manually applied contour and an active contour without directional information, respectively.
Figure 6C:
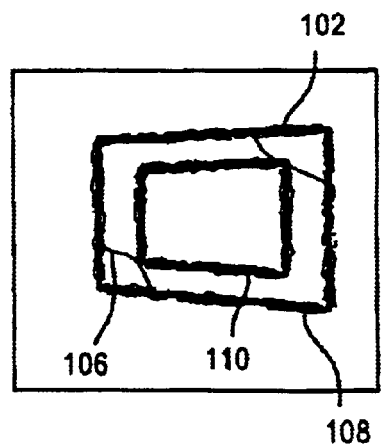
Figure 7A:
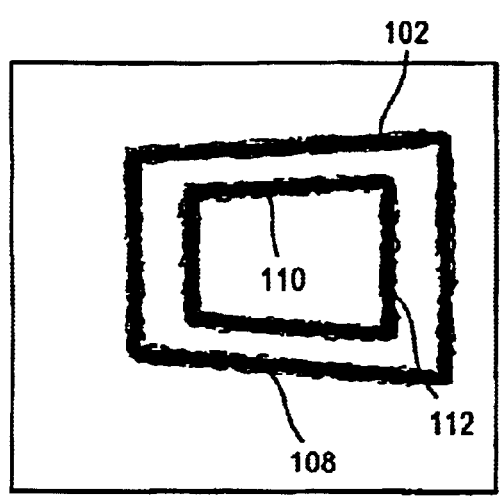
FIGS. 7A and 7B are the gradient magnitude image of the black and white image of FIG. 6A with an active contour applied using directional information of one value and directional information of another value, respectively.
Figure 7B:
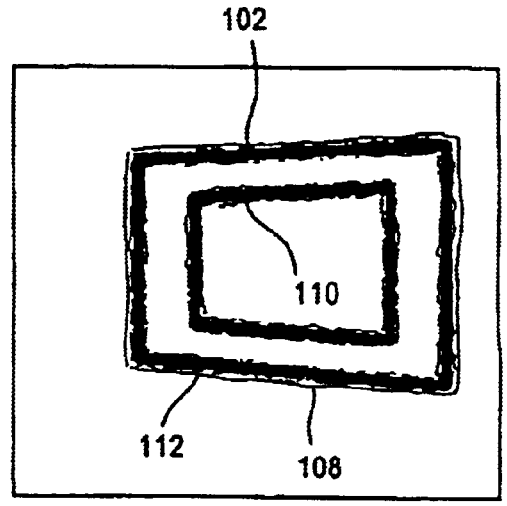

FIGS. 6a–c illustrate this limitation in the conventional magnitude-only active contour model. A black and white image 100 is shown in FIG. 6(a). A gradient magnitude image 102 of the black and white image is shown in FIGS. 6b and 6c. Also shown in FIG. 6b is a manually-defined initial contour 104 overlaid onto the gradient magnitude image 102. Also shown in FIG. 6c is an active contour 106 derived based on a conventional active contour model, and overlaid on the gradient magnitude image 102. In this example, the gradient magnitude image 102 is obtained by applying a 5×5 DOG kernel. As shown in FIG. 6c, the conventional active contour 106 fails to converge to either the outer boundary 108 or the inner boundary 110 of the gradient magnitude image 103. Referring to FIGS. 7a and 7b, the gradient magnitude image 102 is shown with an active contour 112 derived according to an embodiment of this invention. Specifically, the active contour 112 is based not just on gradient magnitude, but also on gradient direction. By including gradient direction information the active contour 112 converges on one of the inner boundary 110 (FIG. 7a) or the outer boundary 108 (FIG. 7b) rather than lying partly on both boundaries 108, 110. The specific result depends on the directional information.

To consider the directional information of the gradient, the external energy of the image redefined as follows:

$$\frac{\partial E_{ext}}{\partial x_i} = \begin{cases} -\frac{\partial}{\partial x}|\nabla f(s_i)| & \text{if } |\theta_G(s_i) - \theta_N(s_i)| \leq \pi/2 \\ 0 & \text{otherwise} \end{cases} \quad (7)$$

$$\frac{\partial E_{ext}}{\partial y_i} = \begin{cases} -\frac{\partial}{\partial y}|\nabla f(s_i)| & \text{if } |\theta_G(s_i) - \theta_N(s_i)| \leq \pi/2 \\ 0 & \text{otherwise} \end{cases}$$

where $\theta_N(s_i)$ is the contour's normal direction at the i-th snaxel $s_i$ as follows, $$\theta_N(s_i) = \theta_c(s_i) + \lambda_i * \frac{\pi}{2} \quad (8)$$

where $\theta_C(s_i)$ is the counterclockwise contour direction at $s_i$ and $\lambda_i$ is a directional parameter for the ith snaxel defined as 1 or −1 according to the predefined gradient direction of the contour. $\theta_C$ is obtained as follows:

$$\text{Let } \theta_1 = \arctan\left[\frac{y_i - y_{i-1}}{x_i - x_{i-1}}\right] \text{ and } \theta_2 = \arctan\left[\frac{y_{i+1} - y_i}{x_{i+1} - x_i}\right] \quad (9)$$

$$\theta_1' = \begin{cases} \theta_1 + 2\pi & \text{if } \theta_1 < -\frac{\pi}{2} \text{ and } \theta_2 > \frac{\pi}{2} \\ \theta_1 & \text{otherwise} \end{cases}$$

-continued $$\theta_2' = \begin{cases} \theta_2 + 2\pi & \text{if } \theta_2 < -\frac{\pi}{2} \text{ and } \theta_1 > \frac{\pi}{2} \\ \theta_2 & \text{otherwise} \end{cases}$$

$$\theta_c(s_i) = \frac{1}{2}(\theta_1' + \theta_2')$$

where $(x_{i-1}, y_{i-1})$, $(x_i, y_i)$ and $(x_{i+1}, y_{i+1})$ are the 2D coordinates of the snaxels $s_{i-1}$, $s_i$ and $s_{i+1}$ respectively. When the gradient direction at $s_i$ is to be inward, $\lambda_i$ is 1. Otherwise, $\lambda_i$ is −1. When the contour normal direction is opposite to the gradient direction, the external energy is maximum, i.e., zero according to Eq. (7). In such case, the developed directional contour does not get attracted to the edges with an opposite direction to the gradient direction. Thus, only the edges with a correct gradient direction participate in the active contour minimization process of Eq. (4).

In applying a directional contour, the directional parameters $\{\lambda_i\}$ are defined from the contour of the previous frame as follows:

$$\lambda_1 = \begin{cases} +1 & \text{if } |\theta_G(s_i) - \theta_C(s_i)| \leq \pi/2 \\ -1 & \text{otherwise} \end{cases} \text{ for } i = 1, 2, \ldots, N \quad (10)$$

Therefore, the directional parameters for the (k+1)th frame are computed from the contour direction $\theta_C$ and the gradient direction $\theta_G$ of the kth frame as given in Eq. (10). The computed directional parameters $\{\lambda_i\}$ and the kth frame contour ($C_k$) are used as the initial directional contour for the segmentation of the (k+1)th frame. Since the directional parameters are determined from the segmented contour of the previous frame, the segmentation result could be degraded if the directional parameters change frequently along the frame sequence. This means that the directional parameters of the previous frame could be different from those of the current frame.

The segmentation result depends on the predefined directional parameters. FIG. 7a and 7b depict the segmentation results with the directional parameter of 1 and −1 for all snaxels, respectively. When the directional parameter is 1 (FIG. 7a), the directional contour makes the contour converge toward the boundary edges with an inward gradient direction, i.e., the gradient direction is the left-hand side of the contour's counterclockwise direction. However, the contour moves toward boundary edges with an outward gradient direction when the directional parameter is −1(FIG. 7b). In this example, the directional parameters for all the snaxels in the contour are the same. However, different directional parameters are assigned to different snaxels along a contour according to the directional gradient analysis. In such case, the snaxels with the directional parameters of 1 converge onto the inside edges, and the snaxels with the directional parameters of −1 converge onto the outside edges. Accordingly, it is desirable to derive the directional parameters for all snaxels of an initial contour. More specifically, in video segmentation and tracking, the directional parameters from the segmentation result of the previous frame are used.

Object Segmentation Using Directional Active Contour Model

Figure 8:
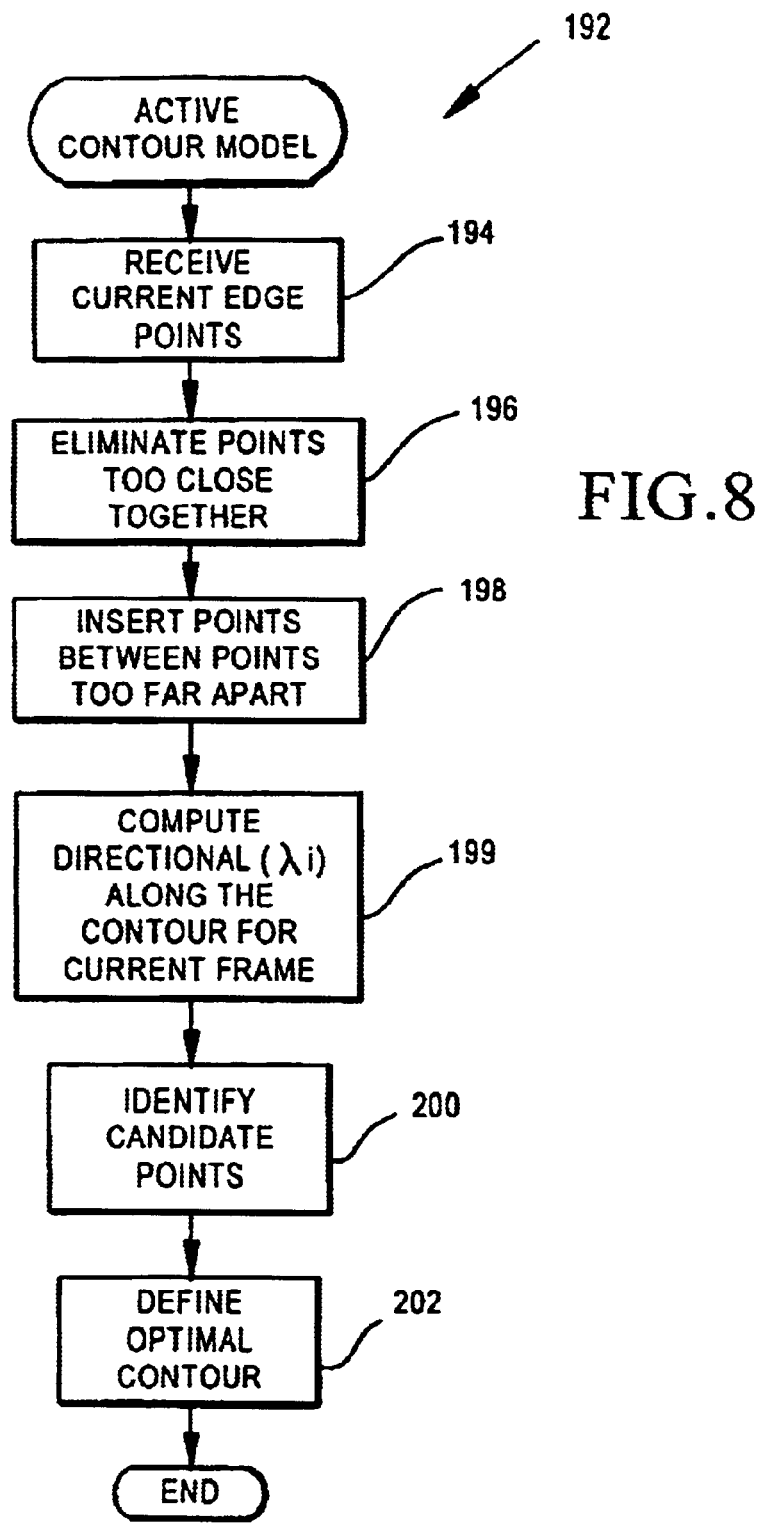
FIG. 8 is a flow chart of the active contour modelling process.

Referring to FIG. 8, a flow chart 192 of an alternative active contour model embodiment is shown for implementing the object segmentation steps 76, 94 (see FIG. 4). In this embodiment a dynamic programming search is performed. In a first step 194, edge points are input. The number of input edge points may vary. At step 196, the edge points which are too close together are eliminated, (i.e., less than a first threshold distance apart). In one embodiment points are considered too close together when they are less than 2.5 pixels apart. In other embodiments the distance may be smaller or larger. At step 198 additional points are added by interpolation where the adjacent points are too far apart, (i.e., greater than a second threshold distance apart). In one embodiment points are considered too far apart together when they are greater than 6.0 pixels apart. In other embodiments the distance may be smaller or larger than 6.0 while being larger than the first threshold distance.

At this stage of the process there are a given number of current edge points, as modified from the input edge points. Although the number of edge points may vary from contour to contour, we will describe the process for N current edge points.

At step 199, the directional parameters $\{\lambda_1\}$ are derived for the edge points using equations (7) through (10). In one embodiment the active contour modelling process performs global relaxation on the N current edge points at step 200. To do so, for each current edge point, up to M candidate points are selected from a box around the current edge point. In one embodiment M equals 4, although in various embodiments the number of candidate points may vary. In one embodiment a 5×5 box is used. However, the size of the box may vary. A larger box leads to a more flexible contour, but more computation time. The shape of the box may be square, rectangular or another shape.

In a preferred embodiment, fewer than the M potential candidate points are derived based upon the directional information. Specifically, rather than identify a candidate point in each potential direction about the edge point, candidate points are selected which conform to the directional gradient information. Thus, candidate points are eliminated that do not satisfy the criterion of equation (10).

Figure 9:
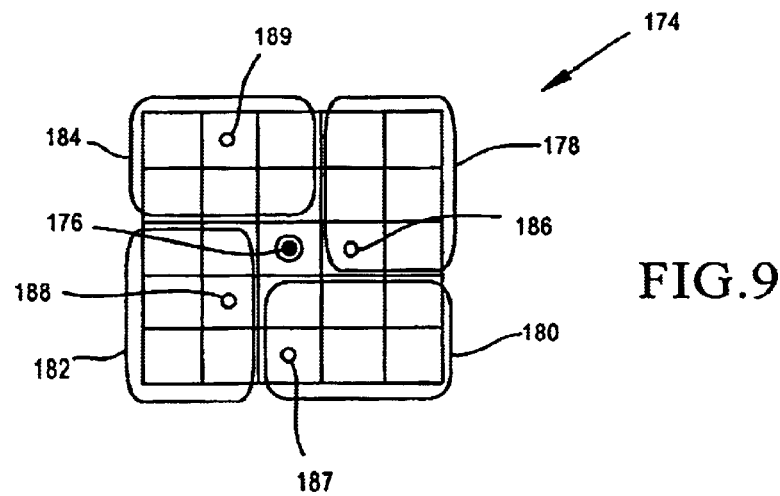
FIG. 9 is a diagram of a 5×5 pixel domain about a current edge point (pixel) used for selecting other candidate points which might be used in place of the current edge point.

Referring to FIG. 9, a 5×5 box 174 of pixels surrounding the current edge point 176 is divided into four regions 178, 180, 182, 184 to consider candidates in all directions. One or two of these regions are eliminated when considering the directional information.

Within each remaining region there are 6 pixels. One of those 6 pixels is selected in each region to be a candidate pixel ('point') which may potentially replace the current edge point 176 as an object boundary edge point. Thus, one, two or three candidate points 186–189 are selected for each current edge point 176. In alternative embodiments a different number of candidate points, or another method of selecting candidate points which conform to the directional information, may be used.

Figure 10:
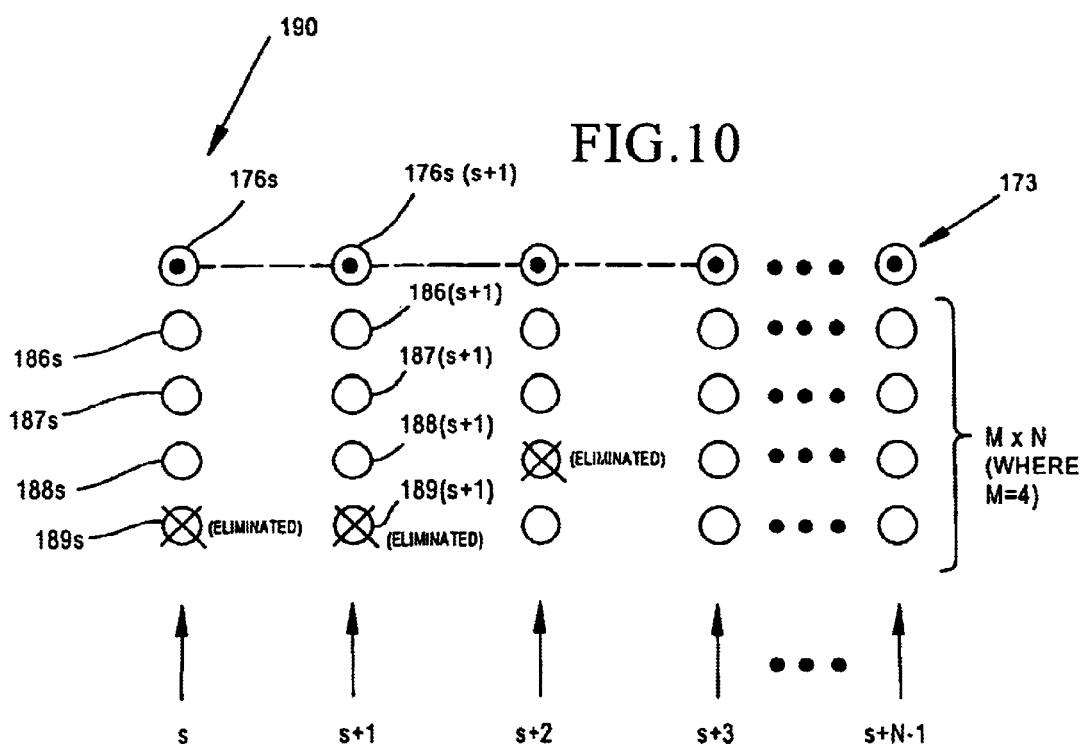
FIG. 10 is a diagram of potential edge points processed to preserve one optimal path for an image object boundary.

For a given region, the candidate point is the pixel among the 6 potential points which has the highest edge potential energy. For an image object boundary which has N current edge points, and where there are M (e.g., four) alternative candidate points for each one of the N points, there are (M+1)N (e.g., 5N) possible contours from which to select the modelled image object boundary. At step 202 a travel algorithm is applied to the current edge points with the alternative candidate points to select an optimal contour path. FIG. 10 shows a travel path diagram for the possible contours. There are (M+1 (e.g., 5) points in each column. The five points correspond to a current edge point 176 and four candidate edge points 186, 189 for such current edge point 176. The number of points in each row (which also equals the number of columns) corresponds to N. Using the directional information, the travel problem is simplified as some of the path permutations do not conform to the directional gradient information, (see equations 6–10 above).

To choose the optimal image object boundary, a starting location 190 on the current contour is selected. Such location 190 corresponds to any given current edge point 176 and its respective candidate edge points (e.g., a subset of points 186–189). Thus, there are less than M+1=5 points at each decision point on the travel path. An optimal path is derived from the potential points. Of the potential paths the most optimal path is selected to be the modelled object boundary. The process for deriving the optimal path is the same for each of the paths be derived.

Figure 11:
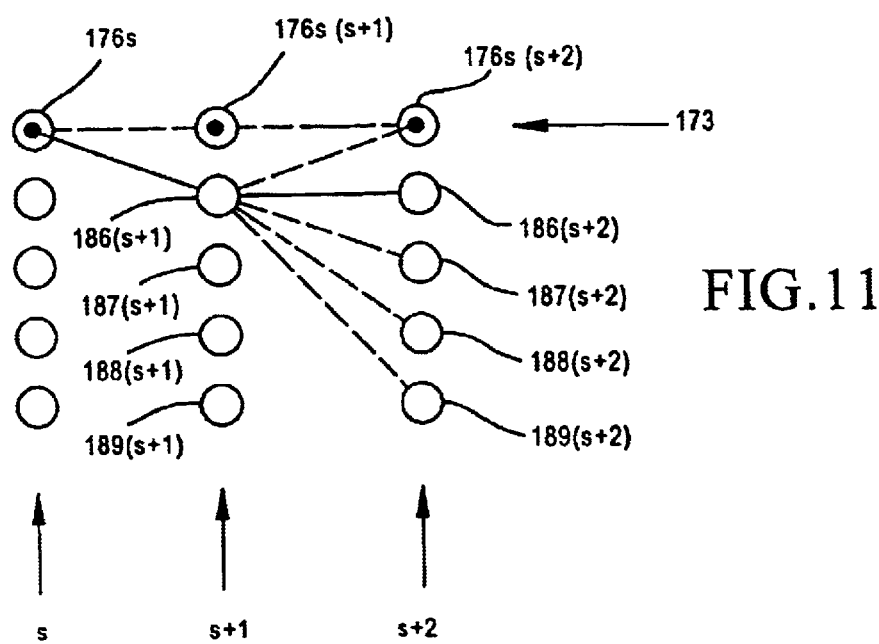
FIG. 11 is a partial travel path of the contour in the process of being derived from the set of points of FIG. 10.

Referring to FIGS. 10 and 11, consider a path that is to start from edge point 176s. A segment of the path is constructed by advancing to one of the points in the adjacent column s+1. Thus, one choice is to step to point 176(s+1). Another choice is to step to candidate point 186(s+1). The others choices may include 187(s+1), 188(s+1) and 189(s+1). In this instance, choice 189(s+1) does not conform to the directional gradient information and is not considered. Only one choice is selected. The choice is made by determining for which of the points in column (s+1) the resulting path has the least difference in energy (e.g., the most energy savings). The selected point is preserved along with a distance of how far such point is from the current point in column s+1. Consider an example where point 186(s+1) is selected. Such point is preserved along with a distance value (e.g., in pixels) of far many pixels such point is from the point 176(s+1).

Similarly, to construct the next segment of the path a point among the potential points in column s+2 is selected. For each segment along the path only one of the potential segments are preserved, along with a distance from such point to the current point 176 in the same column.

The same process is performed to derive a path which starts from point 186s. A first segment of the path is constructed by advancing to one of the points in the adjacent column s+1. One choice is to step to point 176 (s+1). Another choice is to step to candidate point 186(s+1). The others choices include 187(s+1) and 188(s+1). Only one choice is selected. The choice is made by determining for which of the points in column (s+1) the resulting path has the most difference in energy relative to the current contour 173. The selected point is preserved along with a distance of how far such point is from the current point in column s+1. Respective paths starting from point 187s and 188s, respectively, are constructed in the same manner. Point 189s is not considered as it was not selected as a candidate point based on the directional gradient analysis. The resulting paths (starting respectively from 176s, 186s, 187s, and 188s) are compared to see which one is the most optimal path, (e.g., most difference in energy relative to the current contour 173).

Exemplary implementations of the object segmentation methods include, but are not limited to video encoding, video editing and computer vision. For example, the segmentation and modelling may be performed in the context of MPEG4 video encoding and content based video editing in which video objects from different video clips are grouped together to form a new video sequence. As an example of a computer vision application, the segmentation and modelling may be performed with limited user assistance to track a target (e.g., military or surveillance context). Once the target is locked with user assistance, the tracking and segmentation methods automatically provide information to follow the target.

Meritorious and Advantageous Effects

According to an advantage of this invention, an accurate boundary of an object is tracked for objects which deform or include rapidly moving sub-portions. The ability to track a wide variety of object shapes and differing object deformation patterns is particularly beneficial for use with MPEG-4 image processing systems.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for estimating a desired contour of an image object which is tracked over a plurality of image frames, comprising the steps of:

receiving a first estimate of the desired contour for a current image frame, the current image frame comprising image data, said first estimate comprising a plurality of data points;

convolving said image data with a gradient operator in a first manner to derive a gradient magnitude;

convolving said image data with the gradient operator in a second manner to derive a gradient direction;

deriving a directional parameter for each one of said data points, wherein for each one of said data points said directional parameter has a value selected from a common range consisting of a first value and a second value, the first value corresponding to an inward convergence and the second value corresponding to an outward convergence, wherein said directional parameter is derived based upon a contour direction and a gradient direction from a prior image frame of the plurality of image frames;

deriving a contour direction for each one of said data points for the current image frame;

deriving external energy for each one of said data points based on said gradient magnitude, the corresponding contour direction and the corresponding directional parameter; and re-estimating the desired contour based at least in part on said derived external energy, in which the step of re-estimating comprises:

for each one data point of said plurality of data points, testing, neighboring image data to identify a plurality of candidate data points which conform to the directional parameter of said corresponding each one data points; and selecting a path among the plurality data points and corresponding candidate points based on energy of the path.

2. The method of claim 1, wherein said step of convolving in the second manner comprises:

convolving said image data with the gradient operator in the second manner, based on a derived gradient direction from a prior image frame, to derive said gradient direction for said current image frame.

3. The method of claim 1, in which said steps of receiving, convolving in the first manner, convolving in the second manner, deriving the directional parameter, deriving the contour direction, deriving the external energy, and re-estimating are performed for a sequence of image frames, and wherein the first estimate of the desired contour for one image frame is the re-estimated desired contour from a preceding image frame, and wherein said derived gradient direction for said one image frame is derived based in part on the derived gradient direction for said preceding image frame.

4. The method of claim 1, in which said step of convolving in the first manner comprises:

for each one select point of a plurality of image points of the current image frame, convolving said one select point with said gradient operator in the first manner to derive the gradient magnitude corresponding to said one select point, said gradient operator based on a kernel of image data in the vicinity of said one select point.

5. The method of claim 1, in which said step of convolving in the second manner comprises:

for each one select point of a plurality of image points of the current image frame, convolving said one select point with said gradient operator in the second manner to derive the gradient direction corresponding to said one select point, said gradient operator based on a kernel of image data in the vicinity of said one select point and a corresponding gradient operator derived for a prior image frame.

6. The method of claim 1, in which the step of selecting comprises: deriving an energy-minimizing spline progressing from a first point, said first point being one point of either (i) one of said plurality of data points comprising the first estimate, or (ii) one of the plurality of candidate points which conform to the directional parameter for said one of said plurality of data points comprising the first estimate, said energy-minimizing spline being based on internal constraint forces for the image object and external image forces about said image object, said external image forces derived as a function of said gradient magnitude, the corresponding contour direction and directional parameter.

7. An apparatus for estimating a desired contour of an image object which is tracked over a plurality of image frames, the apparatus comprising:

a processor which receives a first estimate of the desired contour for a current image frame, the processor re-estimating the desired contour; and memory which stores said re-estimated desired contour;

wherein the current image frame comprises image data, said first estimate comprising a plurality of data points, wherein said processor performs a plurality of tasks comprising:

(a) convolving said image data with a gradient operator in a first manner to derive a gradient magnitude;

(b) convolving said image data with the gradient operator in a second manner to derive a gradient direction;

(c) deriving a directional parameter for each one of said data points, wherein for each one of said data points said directional parameter has a value selected from a common range consisting of a first value and a second value, the first value corresponding to an inward convergence and the second value corresponding to an outward convergence, wherein said directional parameter is derived based upon a contour direction and a gradient direction from a prior image frame of the plurality of image frames;

(d) deriving a contour direction for each one of said data points for the current image frame;

(e) deriving external energy for each one of said data points based on said gradient magnitude, the corresponding contour direction and directional parameter; and (f) re-estimating the desired contour based at least in part on said derived external energy, in which the processor task of re-estimating comprises:

for each one data point of said plurality of data points, testing neighboring image data to identify a plurality of candidate data points which conform to the directional parameter of said corresponding each one data point; and selecting a path among the plurality data points and corresponding candidate points based on energy of the path.

8. The apparatus of claim 7, in which said selecting a path comprises:

deriving an energy-minimizing spline progressing from a first point, said first point being one point of either (i) one of said plurality of data points comprising the first estimate, or (ii) one of the plurality of candidate points which conform to the directional parameter for said one of said plurality of data points comprising the first estimate, said energy-minimizing spline being based on internal constraint forces for the image object and external image forces about said image object, said external image forces derived as a function of said gradient magnitude, the corresponding contour direction and directional parameter.

9. An apparatus for estimating a desired contour of an image object which is tracked over a plurality of image frames, comprising:

a first processor which receives a first estimate of the desired contour for a current image frame, the current image frame comprising image data, said first estimate comprising a plurality of data points;

a second processor which convolves said image data with a gradient operator in a first manner to derive a gradient magnitude;

a third processor which convolves said image data with the gradient operator in a second manner to derive a gradient direction;

a fourth processor which derives a directional parameter for each one of said data points, wherein for each one of said data points said directional parameter has a value selected from a common range consisting of a first value and a second value, the first value corresponding to an inward convergence and the second value corresponding to an outward convergence, wherein said directional parameter is derived based upon a contour direction and a gradient direction from a prior image frame of the plurality of image frames;

a fifth processor which derives a contour direction for each one of said data points for the current image frame;

a sixth processor which derives external energy for each one of said data points based on said gradient magnitude, the corresponding contour direction and directional parameter; and a seventh processor which re-estimates the desired contour based at least in part on said derived external energy, in which the seventh processor performs tasks, comprising:

for each one data point of said plurality of data points, testing neighboring image data to identify a plurality of candidate data points which conform to the directional parameter of said corresponding each one data point; and selecting a path among the plurality data points and corresponding candidate points based on energy of the path.

10. The apparatus of claim 9, wherein the first processor, the second processor, the third processor, the fourth processor and the fifth processor are the same processor.

11. The apparatus of claim 9, wherein said third processor convolves said image data with the gradient operator in the second manner, based on a derived gradient direction from a prior image frame, to derive said gradient direction for said current image frame.

12. The apparatus of claim 9, in which said first processor, second processor, third processor, fourth processor, fifth processor, sixth processor and seventh processor act upon a sequence of image frames, and wherein the first estimate of the desired contour for one image frame is the re-estimated desired contour from a preceding image frame, and wherein said derived gradient direction for said one image frame is derived based in part on the derived gradient direction for said preceding image frame.

13. The apparatus of claim 7, in which said second processor convolves, for each one select point of a plurality of image points of the current image frame, said one select point with said gradient operator in the first manner to derive the gradient magnitude corresponding to said one select point, said gradient operator based on a kernel of image data in the vicinity of said one select point.

14. The apparatus of claim 9, in which said third processor convolves, for each one select point of a plurality of image points of the current image frame, said one select point with said gradient operator in the second manner to derive the gradient direction corresponding to said one select point, said gradient operator based on a kernel of image data in the vicinity of said one select point and a corresponding gradient operator derived for a prior image frame.

15. The apparatus of claim 9, in which said selecting the path comprises:

deriving an energy-minimizing spline progressing from a first point, said first point being one point of either (i) one of said plurality of data points comprising the first estimate, or (ii) one of the plurality of candidate points which conform to the directional parameter for said one of said plurality of data points comprising the first estimate, said energy-minimizing spline being based on internal constraint forces for the image object and external image forces about said image object, said external image forces derived as a function of said gradient magnitude, the corresponding contour direction and directional parameter.

* * * * *